US008811173B2

(12) United States Patent
Sherif et al.

(10) Patent No.: US 8,811,173 B2
(45) Date of Patent: Aug. 19, 2014

(54) METHOD OF MANAGING USER TRAFFIC TO PREVENT AGGRESSIVE USERS FROM ABUSING NETWORK RESOURCES

(75) Inventors: Sherif Sherif, Landing, NJ (US); Xin Wang, Morris Plains, NJ (US); Mahmoud Sherif, Landing, NJ (US); Ahmed Tarraf, Bayonne, NJ (US); Jorge Rodriguez, Mountain Lakes, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 184 days.

(21) Appl. No.: 13/021,374

(22) Filed: Feb. 4, 2011

(65) Prior Publication Data
US 2012/0201148 A1   Aug. 9, 2012

(51) Int. Cl.
*H04L 12/26* (2006.01)
*H04W 28/18* (2009.01)

(52) U.S. Cl.
CPC .................................... *H04W 28/18* (2013.01)
USPC ........................ 370/230.1; 370/253; 370/254

(58) Field of Classification Search
None
See application file for complete search history.

(56) References Cited

U.S. PATENT DOCUMENTS

| 2002/0136200 A1* | 9/2002 | St. John ........................ 370/352 |
| 2003/0112802 A1* | 6/2003 | Ono et al. ..................... 370/389 |
| 2005/0036495 A1* | 2/2005 | Wishneusky et al. ...... 370/395.4 |
| 2011/0103316 A1* | 5/2011 | Ulupinar et al. .............. 370/329 |

* cited by examiner

*Primary Examiner* — Jeffrey M Rutkowski
*Assistant Examiner* — Hardikkumar Patel
(74) *Attorney, Agent, or Firm* — Harness, Dickey & Pierce, P.L.C.

(57) ABSTRACT

In one embodiment, a plurality of queues are established corresponding to each of a plurality mobiles, respectively. Data packets associated with the plurality of mobiles are received at a network element. Each received data packet is assigned to a corresponding one of the plurality of queues. A determination operation is performed on a selected one of the plurality of queues to determine whether or not to send one or more packets of each queue from the network gateway element. The determination operation is performed based on a comparison between a packet size of a head packet and an adaptive transmission threshold value associated with the selected queue. The adaptive transmission threshold value is a value that is changed based on an amount data sent from the selected queue. The head data packet being an earliest received data packet in the selected queue.

12 Claims, 5 Drawing Sheets

METHOD OF MANAGING USER TRAFFIC TO PREVENT AGGRESSIVE USERS FROM ABUSING NETWORK RESOURCES

BACKGROUND

1. Field

Example embodiments relate generally to managing user traffic in wireless networks.

2. Related Art

A wireless communications network provides coverage for a number of users of the wireless communications network by delivering data to and forwarding data from the wireless devices of the users. Wireless communications networks have a limited amount of network resources, for example bandwidth, to use in providing coverage for the users. Accordingly, wireless communications networks must choose an order in which the users will be served.

Differences in amounts of data sent to or from the users may vary greatly between different users. Thus it is possible for a relatively small number of heavy data users of the wireless communications network to utilize a relatively large proportion of available bandwidth in the wireless communications network. This type of usage can limit the amount network resources available for other users of the wireless communications network. Accordingly, it may be useful to schedule transmission of data for users of the wireless communications network in a manner that promotes acceptable quality of service for all users.

SUMMARY

Example embodiments relate generally to methods of limiting the degree to which users of a wireless communications network use a disproportionate amount of available network resources with respect to other users.

According to one example embodiment, a plurality of queues is established corresponding to each of a plurality of mobiles, respectively. Data packets associated with the plurality of mobiles are received at the network element. Each of the received data packets is assigned to a corresponding one of the plurality of queues. A determination operation is performed on a selected one of the plurality of queues to determine whether or not to send one or more packets of the selected queue from the network element, based on a packet size of a head data packet and an adaptive transmission threshold value associated with the selected queue.

The selected queue may be a queue having at least one data packet. The adaptive transmission threshold value may change based on an amount data sent from the selected queue. The head data packet may be an earliest received data packet in the selected queue.

The determination operation may include, for each queue, incrementing the adaptive transmission threshold value, comparing a packet size of the head packet in the current queue to an adaptive transmission threshold value, and performing a processing operation. The processing operation may include, if the packet size is less than or equal to the adaptive transmission threshold value, sending the head packet, subtracting the size of the first packet from the adaptive transmission threshold value, and performing the comparing and the processing operation for the next packet in the current queue; and if the packet size is greater than the adaptive transmission threshold value, ending the determination operation for the queue.

The network element may be a packet data network gateway (PGW). The received data packets may be data packets included in a downlink stream between an external network and the mobiles, and the sending step may include sending the head packet from the PGW towards a mobile from among the plurality of mobiles to which the head packet is addressed.

The received data packets may be data packets included in a uplink stream between the mobiles and an external network, and the sending step may include sending the first packet from the PGW towards a destination to which the first packet is addressed.

The determination operation may further include removing the sent packet from the queue.

Incrementing the adaptive transmission threshold value may include adding a reference value to the adaptive transmission threshold value.

The reference value may be the same for each of the plurality of queues, and the reference value is determined based on at least one of a number of users currently accessing the network element, and an amount free resources available at the network element Quality of service (QoS) information corresponding to the plurality of mobiles at the network element may be received from a policy management element. The reference value may be determined for each of the plurality of queues based on a QoS level assigned to the mobile corresponding to the queue.

The reference value may be determined to be higher for queues corresponding to mobiles to which high QoS levels are assigned, and the reference value may be determined to be lower for queues corresponding to mobiles to which low QoS levels are assigned.

The network element may be a base station.

The determination operation may include, for each queue, incrementing the adaptive transmission threshold value, comparing a packet size of the head packet in the current queue to an adaptive transmission threshold value, and performing a processing operation. The processing operation may include, if the packet size is less than or equal to the adaptive transmission threshold value, sending the head packet, subtracting the size of the head packet from the adaptive transmission threshold value, and performing the comparing and the processing operation for the next packet in the current queue; and if the packet size is greater than the adaptive transmission threshold value, ending the determination operation for the queue.

The base station may be an evolved Node B (eNB). The received data packets may be data packets included in an uplink stream between the mobiles and an external network, and the sending step may include sending the head packet from the eNB towards a destination to which the head packet is addressed.

The determination operation may further includes removing the sent packet from the queue.

Incrementing the adaptive transmission threshold value may include adding a reference value to the adaptive transmission threshold value.

The reference value may be the same for each of the plurality of queues, and the reference value may be determined based on at least one of a number of users currently accessing the base station, and an amount of free resources available at the base station.

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
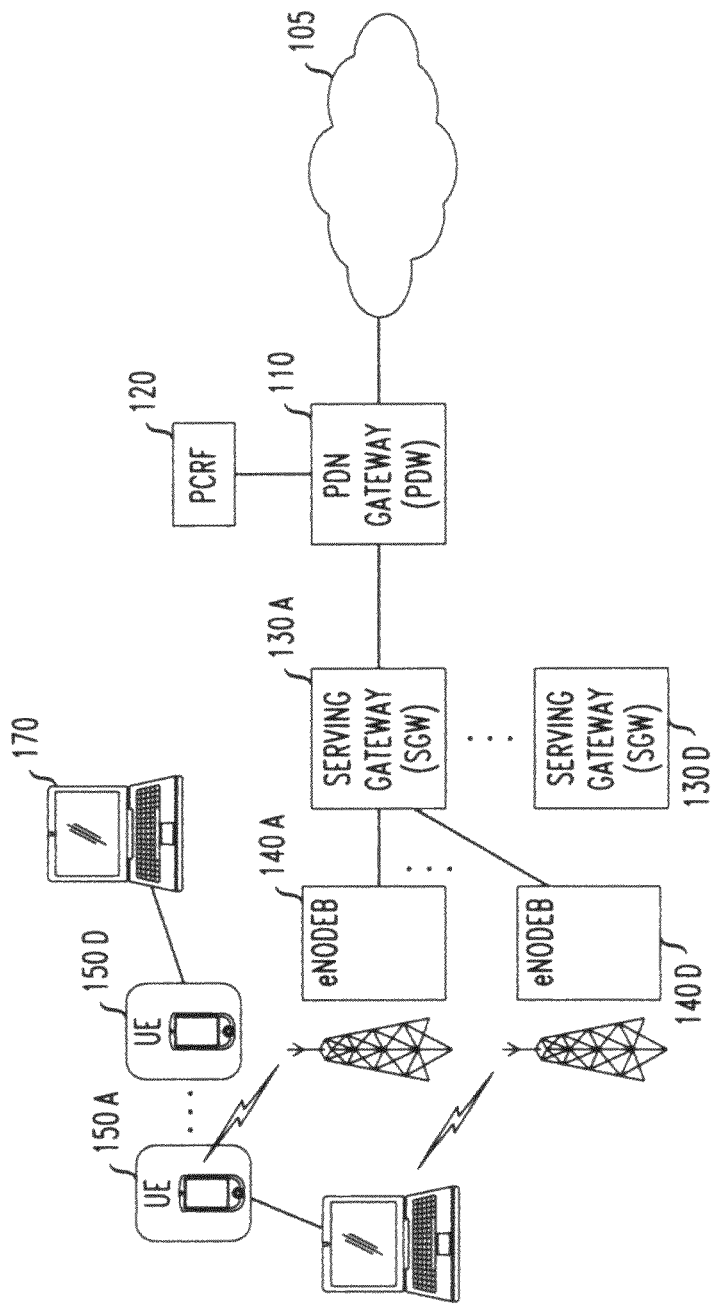
FIG. 1 is a diagram illustrating a portion of a wireless communications network.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, access terminal, receiver, etc., and may describe a remote user of wireless resources in a wireless communication network. The term evolved Node B (eNB) may be considered synonymous to and/or referred to as a base station (BS), base transceiver station (BTS), NodeB, femto cell, access point, etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB, serving gate way (SGW), or packet data network gateway (PGW) illustrated in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

FIG. 1 illustrates a portion of a wireless communications network 100. Wireless communications network 100 may follow, for example, an LTE protocol. Wireless communications network 100 includes a packet data network (PDN) gateway 110; a policy charging and rules function (PCRF) node 120; first through fourth serving gateways (SGWs) 130A-D; first through fourth evolved Node Bs (eNBs) 140A-D; first through fourth user equipment (UE) 150A-D; and first and second electronic devices 160 and 170. Though not pictured, wireless communications network 100 may include other elements of an LTE core network including, for example, one or more mobility management entities (MMEs).

The PDN 110 is capable of providing access to external data networks for UEs within the wireless communication network 100. The PDN 110 is connected to the internet 105. The PDN 110 may also be connected to the PCRF 120. The PCRF 120 is capable of accessing information and functions used by an operator of the wireless communications network 100 to manage and/or monitor network usage including, for example, subscriber databases, charging functions, and network policy information.

The PDN 110 is also connected to UEs 150A-D via first through fourth SGWs 130A-D and first through fourth eNBs 140A-D. The PDN 101 is capable of sending and receiving data to and from the internet 101 and each of the first through fourth SGWs 130A-D. The PDN 110 is capable of buffering data received from, or addressed to, UEs in the wireless communications network 100, and determining a schedule for forwarding the data to its intended destination. Though for the purpose of simplicity, wireless communications network 100 is illustrated as including only one PDN 110, the wireless communications network 100 may include any number of PDNs. Further, though for the purpose of simplicity, PDN 110 is illustrated as being connected to only four SGWs 130A-D, the PDN 110 may be connected to any number of SGWs.

The first through fourth SGWs 130A-D are capable of sending and receiving data to and from the PDN 110. The first through fourth SGWs 130A-D are capable of receiving, routing and forwarding user data packets of UEs in wireless communications network 100 via eNBs connected to the first through fourth SGWs 130A-D. The first through fourth SGWs 130A-D are capable of buffering data received from, or addressed to, UEs connected to the SGWs 130A-D, and determining a schedule for forwarding the data to its intended destination. First SGW 130A is connected to UEs 150A-D via first through fourth eNBs 140A-D. Though for the purpose of simplicity only first through fourth eNBs 140A-D are illustrated in wireless communications network 100, SGWs 130A-D may each be connected to any number of UEs via any number of eNBs.

The first through fourth eNBs 140A-D provide wireless access to the wireless communications network 100 for UEs within the coverage areas of each of the first through fourth eNBS 140A-D, respectively. The first through fourth SGWs 130A-D are capable of buffering data received from, or addressed to, UEs in the wireless communications network 100, and determining a schedule for forwarding the data to its intended destination.

The first through fourth UEs 150A-150D are in wireless communication with the first eNB 140A. Examples of the first through fourth UEs 150A-D include mobile phones, smart phones, computers, gaming devices, or personal digital assistants (PDAs). Some UEs within wireless communications network 100 may be capable of acting as an access point for other electronic devices. For example, first and fourth UEs 150A and 150D may provide access to the Internet 101 for electronic devices 160 and 170, respectively, via the wireless communications network 100. Examples of the electronic devices 160 and 170 include computers, gaming devices, or personal digital assistants (PDAs) connected, via a wireless and/or wired connection, to UEs 150A and 150D, respectively, in order to access the Internet 101 via wireless communications network 100.

Overview of Method of Queuing Packets for Multiple Users at a Network Element

Each of the UEs in the wireless communications network may send and receive data in the form of data packets included in one or more data streams via the wireless network 100. The wireless network 100 may have a limited amount network resources, for example bandwidth, to use to receive data from, and provide data to, UEs that are attached to the wireless network 100. Accordingly, the amount of data which can be forwarded at one time from network elements including, for example, the PDN 110, is limited. Consequently, for data packets waiting at the network elements within the wireless network 100 for forwarding towards a final destination, the network elements must choose the order in which the data packets will be forwarded.

Heavy data users may tie up a disproportionate amount of the network resources available in the wireless communications network 100 thus preventing other data users from having adequate access to those resources available. Accordingly, it may be useful to implement a queuing process that helps ensure fair sharing of network resources available at network elements among multiple users.

As will be discussed in greater detail below, the method of queuing packets for multiple users according to example embodiments may use a deficit round robin scheme and operate over multiple cycles on each of a plurality of queues of data packets corresponding to each of a plurality of users sending and/or receiving data packets via a network element. The method of queuing packets for multiple users according to example embodiments applies a deficit value to each individual queue to limit the amount of data any single user is allowed to send and/or receive in a given cycle. The deficit value is an adaptive transmission threshold which changes for each queue based on an amount of data sent form the queue, and is used to determine when packets are sent. Further, because the method of queuing packets for multiple users according to example embodiments can be applied on a per-user basis, the amount of processing effort required, per user, to make a determination regarding sending a packet may be defined as $O(n)=O(1)$, where n is the number of users, in big-O notation. Accordingly, the method of queuing packets for multiple users according to example embodiments may be implemented while requiring a low amount of processing power per user.

The method of queuing packets for multiple users at a network element for a plurality of mobile devices according to example embodiments will now be discussed with reference to the wireless network 100 illustrated in FIG. 1. First, the method of queuing packets for multiple users at a network element according to example embodiments will be explained below with reference to two example scenarios: 1) applying the method of queuing packets to downlink and/or uplink packets at a PGW will be discussed with reference to FIGS. 1-4; and 2) applying the method of queuing packets to uplink packets at an eNB will be discussed with reference to FIGS. 1, 3-4 and 5. Next an example algorithm defining a portion of the method of queuing packets according to example embodiments will be discussed. Next, an example operation of a network element performing multiple cycles of the method of queuing packets according to example embodiments will be explained with reference to FIG. 4.

Applying the Method of Queuing Packets for Multiple Users to Downlink and/or Uplink Packets at a PGW.

The first example scenario will be explained with reference to the PGW 110 applying the method of queuing packets to packets in downlink data streams traveling from the Internet 105 towards the first through fourth UEs 150A-D, through the PGW 110, and to packets of uplink data streams traveling from the first through fourth UEs 150A-D towards the Internet 105, through the PGW 110. The first example scenario will now be explained with reference to FIGS. 1-4.

Though, for the purpose of simplicity, the method of queuing packets for multiple users at a PGW according to example embodiments is described for both uplink and downlink packets, according to example embodiments, the method does not have to be applied by the PGW to both downlink and uplink packets. The method can also be applied by the PGW only to downlink packets, or only to uplink packets.

Further, though, for the purpose of simplicity, the method of queuing packets for multiple users according to example embodiments is described with reference to a PGW, the methods described below may also be performed at an SGW, for example first through fourth SGWs 130A-D.

Figure 2:
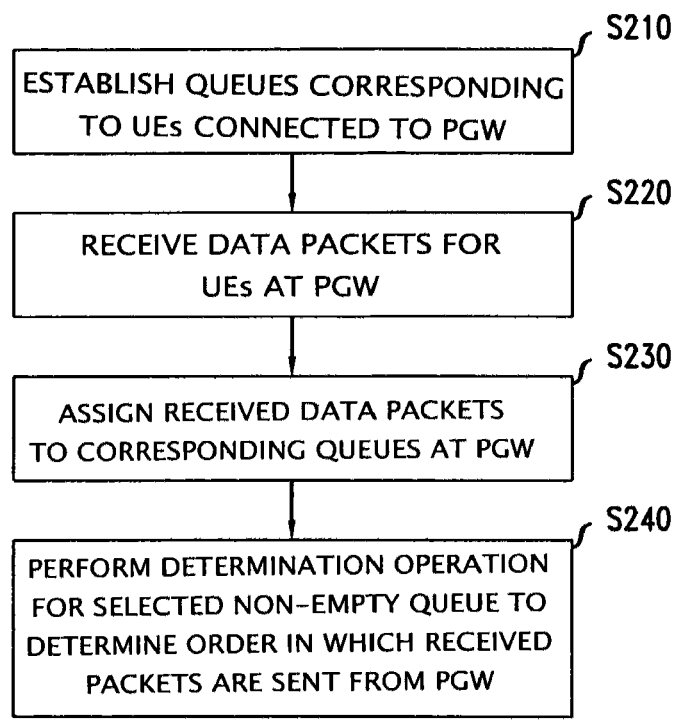
FIG. 2 is a flow chart illustrating a method for queuing data packets for multiple users at a packet data network gateway (PGW) according to an example embodiment.

FIG. 2 illustrates an example flow chart of the method of queuing packets for multiple users applied at a PGW. Referring to FIG. 2, in step S210 the PGW 110 establishes queues corresponding to each of the UEs connected to the PGW 110 for which the PGW 110 is receiving data streams. For example, the PGW 110 may establish queues for all UEs connected to the PGW 110 through first through fourth SGWs 130A-D and first through fourth eNBs 140A-D. In the present example, queues established for the first through fourth UEs 150A-D will be discussed.

In step S220, the PGW 110 receives data packets for the first through fourth UEs 150A-D. For example, if the received packets are downlink packets, the PGW 110 may receive a plurality of data packets for UEs 150A-D via the data streams between the Internet 105 and the UEs 150A-D. If the received packets are uplink packets, the PGW 110 may receive a plurality of data packets from UEs 150A-D via the data streams between the UEs 150A-D and the Internet 105. The PGW 110 may store the received packets in a buffer.

In step S230, the PGW 110 assigns the received data packets to the queues established in step S210. The PGW 110 may include separate queues for downlink packets and uplink packets. An example of the content of the queues after packets have been assigned to the queues will now be discussed with reference to FIG. 4

Figure 4:
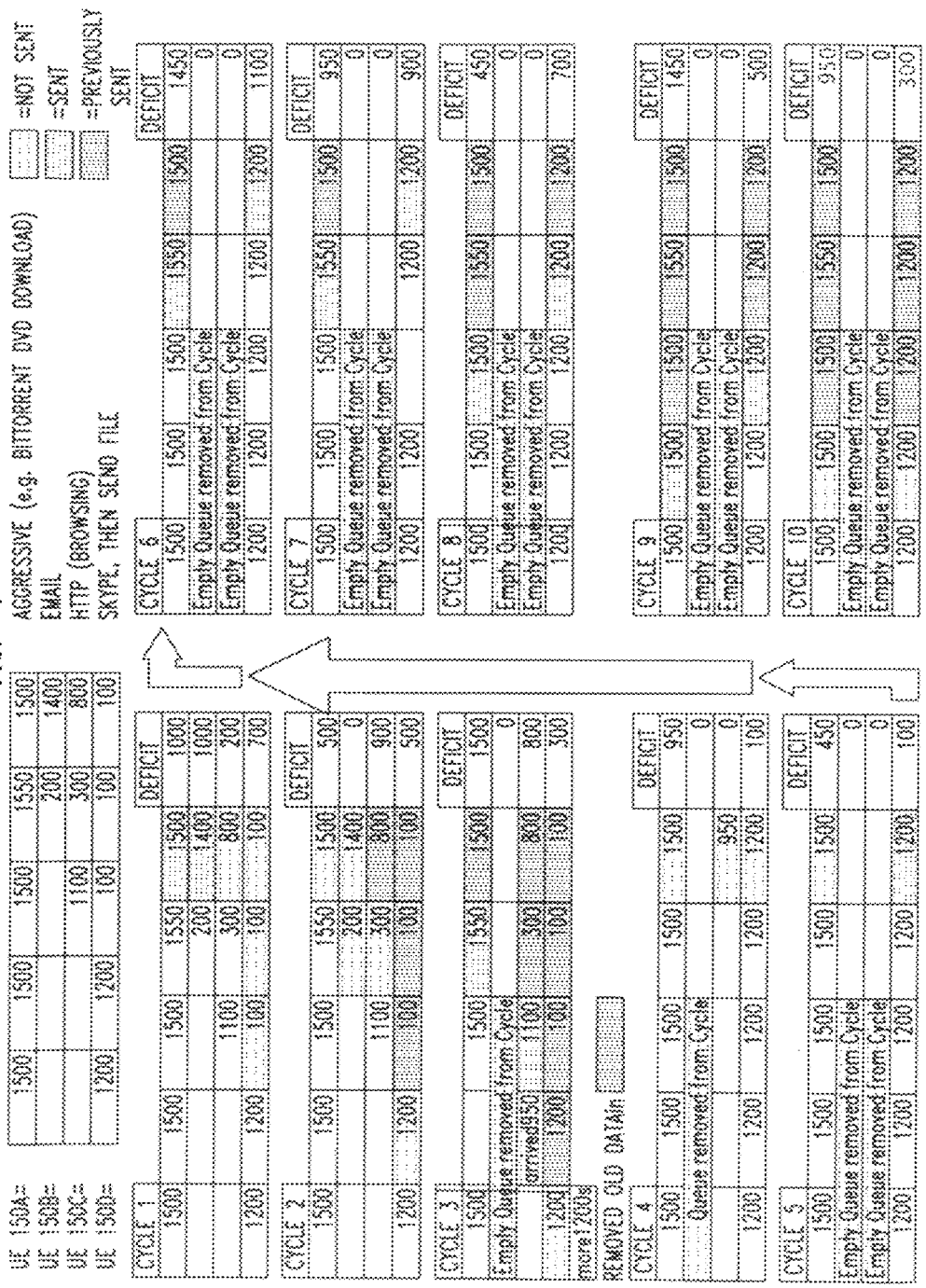
FIG. 4 illustrates example contents of packet queues for UEs stored a network element implementing the method of queuing packets according to an example embodiment.

FIG. 4 illustrates example contents of packet queues corresponding to UEs stored at a network element implementing the method of queuing packets according of example embodiments. FIG. 4 illustrates example contents during multiple stages of the method of queuing packets according of example embodiments. Referring to FIG. 4, table 405 illustrates examples of the contents of queues for first through fourth UEs 150A-D. As illustrated in FIG. 4, the size and number of the data packets received for each of the first through fourth UEs 150A-D may vary depending on the data requirements of activities being performed at the UEs 150A-D. In the example illustrated in FIG. 4, a user of the first UE 150A is downloading a DVD movie file which requires a relatively large number of larger packets, while a user of the second UE 150B is checking an email message, which requires only 2 packets. A user of the third UE 150C is browsing a website and a user of the fourth UE 150D is first involved in a video chat session, for example Skype, then sends a file. The examples illustrated in FIG. 4 serve as examples of the contents of downlink packet queues stored a network element as well as contents of uplink packet queues stored at a network element.

Returning to FIG. 2, in step S240, the PGW 110 performs a determination operation on each non-empty queue to determine which packets to send. The determination operation may be based on the deficit round robin scheme. The PGW 110 performs the determination operation over a number of cycles. For example, for each cycle, the determination operation may be performed sequentially on each of the plurality of queues. Accordingly, the determination operation may be performed for each user on a per-user basis without the need to take into account parameters associated with other users, thus reducing the processing requirements for performing the determination operation.

Based on the deficit round robin scheme, in each cycle, for each queue, a deficit value, or adaptive transmission threshold, associated with the queue is compared with a packet size of a head packet in the queue in order to determine whether or not the head packet will be sent from the PGW 110 towards the intended destination of the packet. The head packet is, for example, the earliest received packet in the queue. As is discussed above the deficit value is an adaptive transmission threshold which changes for each queue based on an amount of data sent form the queue, and is used to determine when packets are sent. The deficit value may be increased by a quantum amount at the beginning of each cycle. The quantum is a reference value which can be used to control a maximum amount of data that can be sent from each queue during a single cycle. Further, the deficit value may be reduced, each time a packet is sent, by an amount based on the size of the sent packet. Accordingly, by comparing the deficit value to the size of the head packet, an amount of data sent by each user, each cycle, is controlled. The determination operation will now be discussed in greater detail below with reference to FIG. 3.

Figure 3:
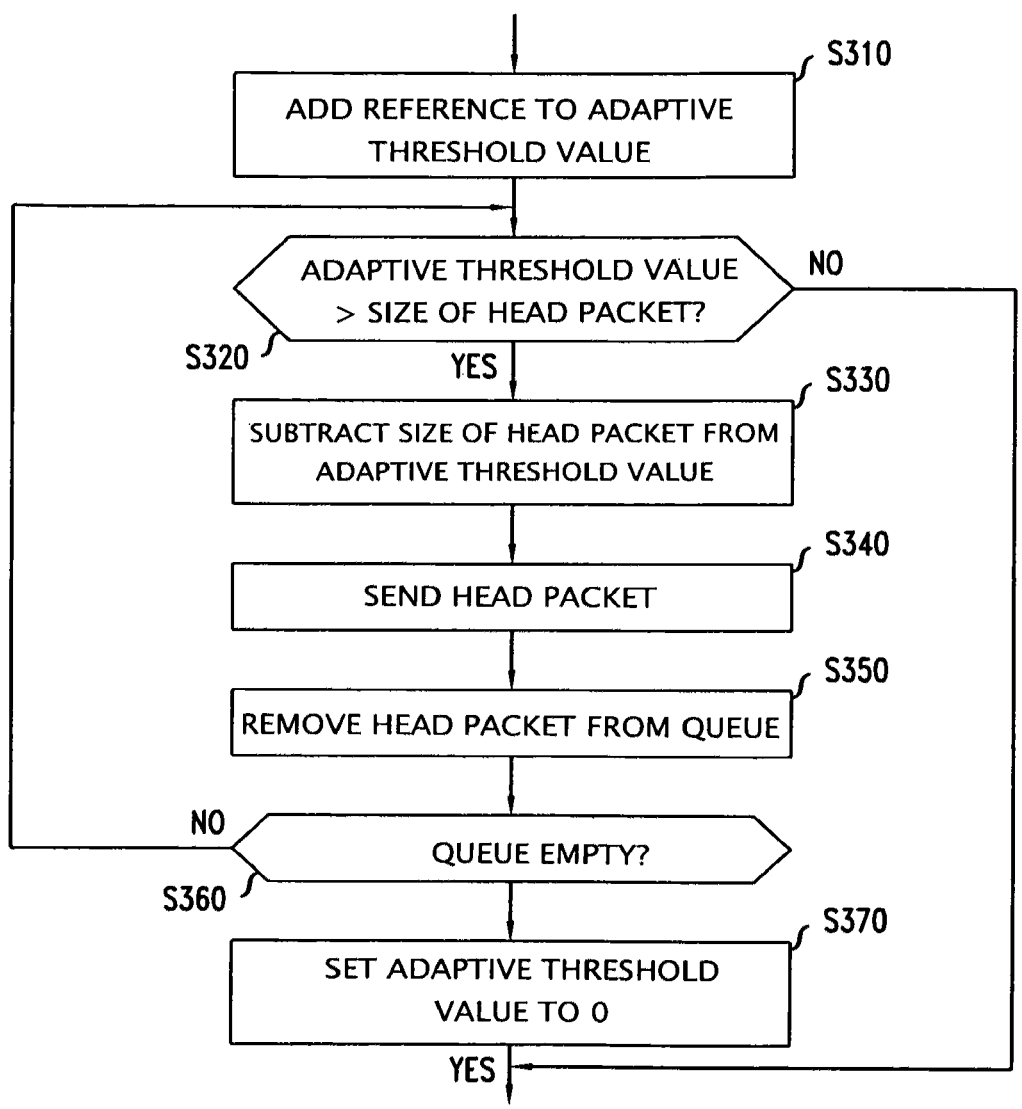
FIG. 3 is a flow chart illustrating a determination operation according to an example embodiment.

FIG. 3 is a flow chart illustrating an example of the determination operation of step S240 of FIG. 2 for one cycle and one queue. The steps illustrated below in FIG. 3 may be applied at the PGW 110 to both uplink packets and downlink packets.

Referring to FIG. 3, in step S310, the PGW 110 adds the quantum to the deficit value for the current queue. The deficit value may be an integral value initialized at, for example, 0. The quantum may be set according to the effect of the determination operation desired by an operator of the wireless network 100 as will be discussed in greater detail below.

In step S320, the PGW 110 determines whether or not the deficit value is greater than a size of the head packet of the current queue.

If, in step S320, the PGW 110 determines the deficit value is not greater than the size of the head packet, the determination operation ends. At this point, the PGW 110 performs the determination operation on the next non-empty queue or, if the current queue is the last queue on which the determination operation has been performed for the current cycle, the PGW 110 begins a new cycle, and performs the determination operation of the first queue of the plurality of queues at the PGW 110.

If, in step S320, the PGW 110 determines the deficit value is greater than the size of the head packet, the PGW 110 proceeds to step S330. In step S330, the PGW 110 subtracts the size of the head packet from the deficit value, thus reducing the size of the deficit value by an amount equal to the size of the head packet.

In step S340, the PGW 110 sends the head packet to its intended destination. For example, for downlink packets, the PGW 110 may send the packet to the first UE 150A via the first SGW 130A and the first eNB 140A. For uplink packets, the PGW 110 may send the packet to an external network, for example, via the internet 105.

In step S350, the PGW 110 removes the head packet from the queue. Accordingly, if there are any remaining packets in the current queue, the next packet in the queue will become the new head packet.

In step S360, the PGW 110 determines whether or not the current queue is empty.

If, in step S360, the PGW 110 determines the current queue is empty, the PGW 110 proceeds to step S370. In step S370, the PGW 110 sets the deficit value to 0. Next, the current cycle of the determination operation ends for the current queue. At this point, the PGW 110 performs the determination operation on the next non-empty queue or, if the current queue is the last queue on which the determination operation has been performed for the current cycle, the PGW 110 begins a new cycle, and performs the determination operation of the first queue of the plurality of queues at the PGW 110.

If, in step S360, the PGW 110 determines the current queue is not empty, the PGW 110 returns to step S320 to compare the size of the new head packet to the reduced deficit value. Accordingly, steps S320-S360 are performed continuously, and multiple packets are sent from the current queue until a size of the current packet exceeds the size of the current deficit.

By incrementing the deficit value at the beginning of each cycle, reducing the deficit value each time a packet is sent, and using the deficit value to determine whether or not send packets for each user in the manner discussed above with reference to FIGS. 1-4, the amount of network resources that may be used by any single user during a single cycle is limited. Further, for each cycle, every user is given a chance to send packets as long as the user's deficit amount is sufficiently high.

Accordingly, in the case of downlink packets, the incidence of a handful of users being responsible for using a substantially disproportionate amount of the available network resources provided by, for example, PGW 110 itself and the network elements connected to the PGW 110, the first through fourth SGWs 130A-D and the first through fourth eNB's 140A-D, is reduced. Accordingly, users receiving downlink data via the PGW 110 are prevented from abusing the network resources provided by the PGW 110, the first through fourth SGWs 130A-D and the first through fourth eNB's 140A-D.

Similarly, in the case of uplink packets, the incidence of a handful of users being responsible for using a substantially disproportionate amount of the available network resources provided by, for example, PGW 110 itself and any network elements that may exists between the PGW 110 and the external networks to which the uplink packets are sent is reduced. Accordingly, users sending uplink data via the PGW 110 are prevented from abusing the network resources provided by the PGW 110 and any network elements that may exists between the PGW 110 and the external networks to which the uplink packets are sent.

Though the method of queuing data packets according to example embodiments is described above as being implemented to downlink and/or uplink packets at the PGW 110, according to example embodiments, the method may also be implemented by other network elements including, for example, an eNB.

Applying the Method of Queuing Packets to Uplink Packets at an eNB

The second example scenario will be explained with reference to applying the method of queuing packets at the eNB 140A to packets of uplink data streams traveling from first through fourth UEs 150A-D towards the internet 105, through the first eNB 140A. The first example scenario will be explained with reference to FIGS. 1 and 3-5.

Figure 5:
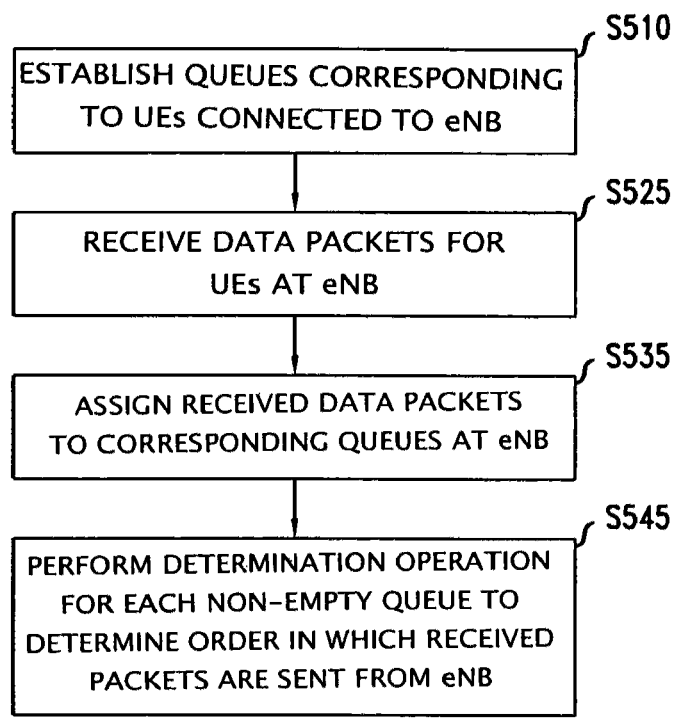
FIG. 5 is a flow chart illustrating a method for queuing data packets for multiple users at an evolved node B (eNB) according to an example embodiment.

FIG. 5 illustrates an example flow chart of the method of queuing packets for multiple users applied at an eNB. Referring to FIG. 5, in step S510 the first eNB 140A establishes queues corresponding to each of the UEs connected to the eNB 140A from which the first eNB 140A is receiving uplink data streams. In the present example, the eNB 140A establishes queues for first through fourth UEs 150A-D.

In step S520, the first eNB 140A receives data packets from the first through fourth UEs 150A-D via a wireless link between the first through fourth UEs 150A-D and the first eNB 140A. The first eNB 140A may store the received packets in a buffer.

In step S530, the first eNB 140A assigns the received data packets to the queues established in step S510. Table 405 in FIG. 4, described above with reference to the first scenario in which the method of queuing data packets is performed at the PGW 110, also serves as an example of the content of queues in the first eNB 140A when the first eNB 140A is implementing the method of queuing data packets according to example embodiments.

In step S540, the first eNB 140A performs a determination operation on each non-empty queue to determine which packets to send. In the same manner discussed above with respect to step S240 in FIG. 2, the determination operation performed in step S540 may be based on the deficit round robin scheme. Accordingly, in step S540, the first eNB 140A may perform the same steps described above for the PGW 110 in FIG. 3.

Accordingly, the first eNB 140A performs the determination operation over a number of cycles. For example, for each cycle, the determination operation may be performed sequentially on each of the plurality of queues. Thus, the determination operation may be performed for each user on a per-user basis without the need to take into account parameters associated with other users, thus reducing the processing requirements for performing the determination operation. Based on the deficit round robin scheme, in each cycle, for each queue, a deficit value associated with the queue is compared with a packet size of a head packet in the queue in order to determine whether or not the head packet will be sent from the first eNB 140A towards the internet 105. The deficit value may be increased by the quantum value at the beginning of each cycle. Further, the deficit value may be reduced each time a packet is sent by an amount based on the size of the sent packet. Accordingly, in the same manner discussed above with reference to step S240, by comparing the deficit value to the size of the head packet, an amount of data sent by each user, each cycle, is controlled.

By implementing the method of queuing packets according to example embodiments to uplink packets at the first eNB 140A in the manner discussed above with reference to FIGS. 1, 3-4, and 5, the amount of network resources that may be used by any single user sending data in an uplink data stream through the first eNB 140A during a single cycle is limited. Accordingly, the incidence of a handful of users being responsible for using a substantially disproportionate amount of the available network resources provided by, for example, the first eNB 140A itself and the network elements connected to the first eNB 140A including the first through SGW 130A and the PGW 110, is reduced. Consequently, users sending uplink data via the first eNB 140A are prevented from abusing the network resources provided by the first eNB 140A, the first through SGW 130A, and the PGW 110.

Example Algorithm Defining Method of Queuing Data Packets

An example algorithm defining the operations performed for each cycle of the determination operation explained above with reference to steps S240 and S540 and FIGS. 2, 3 and 5 is described by the following pseudo code:

```
For every cycle
    For every non-empty user Queue
    {
        Deficit_i += QUANTUM;
        CurrentPkt = Queue_i.GetHead( );
        while (CurrentPkt.PktSize <= Deficit_i && CurrentPkt!=NULL)
        {
            Deficit_i -= CurrentPkt.PktSize;
            Send CurrentPkt;
            Queue_i.RemoveHead( );
```

```
        CurrentPkt = Queue_i.GetHead( );
        if(CurrentPkt==NULL)//Empty
            Deficit_i=0;
    }
}
``` where $Deficit_i$ is the deficit value corresponding to a user i; QUANTUM is the quantum value as is discussed above with reference to FIGS. 3 and 5; CurrentPkt is a packet currently being evaluated by the algorithm; $Queue_i$ is a queue corresponding to the user i; $Queue_i$.GetHead( ) is a function for retrieving the head, or first, packet in the $Queue_i$.CurrentPkt.PktSize is a packet size of the CurretnPkt; and $Queue_i$.RemoveHead( ) is a function for removing the head, or first, packet from the $Queue_i$. As is discussed above with reference to FIGS. 2, 3 and 5, the values $Deficit_i$ and QUANTUM may be, for example, integers; the value $Deficit_i$ may be initialized as '0'; and the value QUANTUM may be set according to the effect of the determination operation desired by an operator of the wireless network 100 as will be discussed in greater detail below.

It will be understood that, according to example embodiments, network elements within the wireless network 100 implementing the method of queuing data packets for multiple users according to example embodiments, for example the PGW 110 and the first eNB 140A, each include the hardware and/or software necessary to implement the algorithm described in the pseudo code above.

Setting the Quantum

As is described above with reference to FIGS. 2, 3, and 5, the method of queuing data packets according to example embodiments includes use of a quantum value. The quantum value is used to increment the deficit values associated with each queue at the beginning of each cycle of the determination operation referenced in steps S240, S540 and FIG. 3. The level to which the quantum value is set can impact the performance of the determination operation, and thus, the performance of the method of queuing data packets according to example embodiments.

For example, lower quantum values provide more limitations on the size of packets which may be sent by a user. As a result, lower quantum values may provide more fairness between multiple users by further limiting a single user's ability to send large packets. However, at the same time, lower quantum values will result in more cycles of the determination operation, and thus, more processing at the network element implementing the method of queuing packets according to example embodiments.

Alternatively, higher quantum values will result in fewer cycles of the determination operation, and thus, less processing at the network element implementing the method of queuing packets according to example embodiments. However, at the same time, higher quantum values may provide less fairness between multiple users by increasing individual users' ability to send large packets.

Accordingly, a network operator implementing the method of queuing data packets according to example embodiments can choose a quantum value based on the preferences of the network operator. For example, the network operator can choose a high quantum value to reduce the processing effort required of the determination operation by reducing the number of cycles, or the network operator can choose a low quantum value that increases the fairness of access to network resources of the communications network between multiple users.

Further, the quantum value may be set dynamically based on conditions experienced at the wireless network 100. For example, at a particular network element, the quantum value may be raised or lowered based on comparison of network characteristics to threshold values. Examples of network characteristics include a total number of users accessing resources at the network element or total amount of free resources at the network element at a given point in time.

Further, though quantum values are discussed in the examples above as being the same for each user, a network element implementing the method of queuing data packets according to example embodiments can choose different quantum values for different users based on characteristics of the users. For example, users may be assigned quantum values based on a quality of service (QoS) level assigned to the user. For example, the PGW 110 may access subscriber data, for example via the PCRF 120, to determine QoS levels associated with different users for which data streams are received at the PGW 110. The PGW 110 can then assign higher quantum values to users with higher QoS priorities, and lower quantum values to users with lower QoS priorities. Accordingly, for example, users of the wireless network 100 who pay more for service, e.g. business class users, may be enabled to send larger amounts of data more often, when compared to other users, as a result of higher the higher quantum values that are used by the PGW 110 when determining when packets may be sent and/or received by that user.

Example Operation of Network Element Implementing the Method of Queuing Data Packets According to Example Embodiments Over Multiple Cycles Examples of the determination operation discussed above with reference to FIG. 3 will now be discussed with reference to FIG. 4.

Referring again to FIG. 4, FIG. 4 illustrates table 405 which illustrates initial contents of queues corresponding to first through fourth UEs 150A-D. Further, FIG. 4 also illustrates example contents of queues at a network element implementing the method illustrated in FIGS. 2 and 3 at the conclusion of each of a plurality of cycles, cycle 1-cycle 10.

The example queues illustrated in FIG. 4 will now explained below as examples of the contents of queues in the PGW 110 when the PGW 110 performs the method of queuing data packets according to example embodiments on downlink packets received at the PGW 110. However, the example queues illustrated in FIG. 4 are also examples of the queues in a PGW when the PGW performs the method of queuing data packets according to example embodiments on uplink packets received at the PGW. Further, the example queues illustrated in FIG. 4 are also examples of the queues in an eNB, for example first eNB 140A, when the eNB performs the method of queuing data packets according to example embodiments on uplink packets received at the eNB.

In the example illustrated in FIG. 4, for the first UE 140A, a steady stream of packets is received at the PGW 110 throughout the cycles 1-10. For the second UE 140B, two packets are initially received at the PGW 110. For the third UE 140C, three packets are initially received at the PGW 110, and a fourth packet is received during cycle 3. For the fourth UE 140D, a steady stream of packets is received at the PGW 110 throughout cycles 1-10. Further, in the example described in FIG. 4, it is assumed that the quantum value is set to 1000 for all of first through fourth UEs 150A-D throughout each of the 10 illustrated cycles.

Cycles 1-4 will now be described in greater detail below.

Cycle 1

Referring to the queue corresponding to the first UE 150A, the PGW 110 increments the deficit value, initialized at 0, by an amount equal to the quantum, 1000. Next, the PGW 110 compares the deficit value to the size of the head packet in the queue. In this case the deficit value, 1000, is not greater than the size of the head packet, 1500. Accordingly, the packet is not sent this cycle.

Referring to the queue corresponding to the second UE 150B, the PGW 110 increments the deficit value, initialized at 0, by an amount equal to the quantum, 1000. Next, the PGW 110 compares the deficit value to the size of the head packet in the queue. In this case the deficit value, 1000, is not greater than the size of the head packet, 1400. Accordingly, the packet is not sent this cycle.

Referring to the queue for the third UE 150C, the PGW 110 increments the deficit value, initialized at 0, by an amount equal to the quantum, 1000. Next, the PGW 110 compares the deficit value to the size of the head packet in the queue. In this case the deficit value, 1000, is greater than the size of the head packet, 800. Accordingly, the PGW 110 subtracts the size of the head packet from the deficit value, the PGW 110 sends the head packet, and the PGW 110 removes the head packet from the queue corresponding to the third UE 150C. The PGW 110 then determines the queue for the third UE 150C is not empty and compares the deficit value, now 200, to the size of the new head packet, now 300. In this case, the deficit value is not greater than the size of the head packet. Accordingly, no more packets are sent this cycle for the third UE 150C.

Referring to the queue for the fourth UE 150D, the PGW 110 increments the deficit value, initialized at 0, by an amount equal to the quantum, 1000. Next, the PGW 110 compares the deficit value to the size of the head packet in the queue. In this case the deficit value, 1000, is greater than the size of the head packet, 100. Accordingly, the PGW 110 subtracts the size of the head packet from the deficit value, the PGW 110 sends the head packet, and the PGW 110 removes the head packet from the queue corresponding to the fourth UE 150D. The PGW 110 then determines the queue for the fourth UE 150D is not empty and compares the deficit value, now 900, to the size of the new head packet, now 100. Because the sizes of the next two packets are both 100, the PGW 110 will perform the operations of reducing the deficit and sending the packets two more times leaving a new deficit value of 700. Now, the deficit value, now 700, is not greater than the size of the head packet, now 1200. Accordingly, no more packets are sent this cycle for the fourth UE 150D.

Cycle 2

Referring to the queue corresponding to the first UE 150A, the PGW 110 increments the deficit value, currently 1000, by an amount equal to the quantum, 1000. Next, the PGW 110 compares the deficit value to the size of the head packet in the queue. In this case the deficit value, now 2000, is greater than the size of the head packet, 1500. Accordingly, the packet is sent, the packet is removed from the queue and the deficit value is reduced from 2000 to 500. The new deficit value is not greater than the size of the new head packet, 1500. Accordingly, now more packets are sent this cycle for the first UE 150A.

Referring to the queue corresponding to the second UE 150B, the PGW 110 increments the deficit value, currently 1000, by an amount equal to the quantum, 1000. Next, the PGW 110 compares the deficit value to the size of the head packet in the queue. In this case the deficit value, now 2000, is greater than the size of the head packet, 1400. Accordingly, the head packet is sent, the head packet is removed from the queue and the deficit value is reduced from 2000 to 600. The new deficit value, 600, is also greater than the size of the new head packet, 200. Accordingly, the head packet is sent and the head packet is removed from the queue. Because the queue is now empty, the PGW 110 sets the deficit value for the queue to 0, and ends the performance of the determination operation on the queue corresponding to the second UE 140B.

Referring to the queue for the third UE 150C, the PGW 110 increments the deficit value, currently 200, by an amount equal to the quantum, 1000. Next, the PGW 110 compares the deficit value to the size of the head packet in the queue. In this case the deficit value, now 1200, is greater than the size of the head packet, now 300. Accordingly, the PGW 110 subtracts the size of the head packet from the deficit value, the PGW 110 sends the head packet, and the PGW 110 removes the head packet from the queue corresponding to the third UE 150C. The PGW 110 then determines the queue for the third UE 150C is not empty and compares the deficit value, now 900, to the size of the new head packet, now 1100. In this case, the deficit value is not greater than the size of the head packet. Accordingly, no more packets are sent this cycle for the third UE 150C.

Referring to the queue for the fourth UE 150D, the PGW 110 increments the deficit value, initialized at 0, by an amount equal to the quantum, 1000. Next, the PGW 110 compares the deficit value to the size of the head packet in the queue. In this case the deficit value, now 1700, is greater than the size of the head packet, now 1200. Accordingly, the PGW 110 subtracts the size of the head packet from the deficit value, the PGW 110 sends the head packet, and the PGW 110 removes the head packet from the queue corresponding to the fourth UE 150D. The PGW 110 then determines the queue for the fourth UE 150D is not empty and compares the deficit value, now 500, to the size of the new head packet, now 1200. In this case, the deficit value is not greater than the size of the head packet. Accordingly, no more packets are sent this cycle for the fourth UE 150D.

Cycle 3

Referring to the queue corresponding to the first UE 150A, the PGW 110 increments the deficit value, currently 500, by an amount equal to the quantum, 1000. Next, the PGW 110 compares the deficit value to the size of the head packet in the queue. In this case the deficit value, now 1500, is not greater than the size of the head packet, 1550. Accordingly, the head packet is not sent during this cycle for the first UE 140A.

Referring to the queue corresponding to the second UE 150B, the PGW 110 detects that the queue is empty. Accordingly, the PGW 110 does not perform the determination operation on the queue corresponding to the second UE 150B for this cycle.

Referring to the queue for the third UE 150C, the PGW 110 increments the deficit value, currently 900, by an amount equal to the quantum, 1000. Next, the PGW 110 compares the deficit value to the size of the head packet in the queue. In this case the deficit value, now 1900, is greater than the size of the head packet, now 1100. Accordingly, the PGW 110 subtracts the size of the head packet from the deficit value, the PGW 110 sends the head packet, and the PGW 110 removes the head packet from the queue corresponding to the third UE 150C. The PGW 110 then determines the queue for the third UE 150C is not empty and compares the deficit value, now 800, to the size of the new head packet, now 950. In this case, the deficit value is not greater than the size of the head packet. Accordingly, no more packets are sent this cycle for the third UE 150C.

Referring to the queue for the fourth UE 150D, the PGW 110 increments the deficit value, initialized at 0, by an amount equal to the quantum, 1000. Next, the PGW 110 compares the deficit value to the size of the head packet in the queue. In this case the deficit value, now 1500, is greater than the size of the head packet, now 1200. Accordingly, the PGW 110 subtracts the size of the head packet from the deficit value, the PGW 110 sends the head packet, and the PGW 110 removes the head packet from the queue corresponding to the fourth UE 150D. The PGW 110 then determines the queue for the fourth UE 150D is not empty and compares the deficit value, now 300, to the size of the new head packet, now 1200. In this case, the deficit value is not greater than the size of the head packet. Accordingly, no more packets are sent this cycle for the fourth UE 150D.

Cycle 4

Referring to the queue corresponding to the first UE 150A, the PGW 110 increments the deficit value, currently 1500, by an amount equal to the quantum, 1000. Next, the PGW 110 compares the deficit value to the size of the head packet in the queue. In this case the deficit value, now 2500, is greater than the size of the head packet, 1550. Accordingly, the PGW 110 subtracts the size of the head packet from the deficit value, the PGW 110 sends the head packet, and the PGW 110 removes the head packet from the queue corresponding to the first UE 150A. The PGW 110 then determines the queue for the first UE 150A is not empty and compares the deficit value, now 950, to the size of the new head packet, now 1500. In this case, the deficit value is not greater than the size of the head packet. Accordingly, no more packets are sent this cycle for the first UE 150A.

Referring to the queue corresponding to the second UE 150B, the PGW 110 detects that the queue is empty. Accordingly, the PGW 110 does not perform the determination operation on the queue corresponding to the second UE 150B for this cycle.

Referring to the queue for the third UE 150C, the PGW 110 increments the deficit value, currently 800, by an amount equal to the quantum, 1000. Next, the PGW 110 compares the deficit value to the size of the head packet in the queue. In this case the deficit value, now 1800, is greater than the size of the head packet, now 950. Accordingly, the PGW 110 subtracts the size of the head packet from the deficit value, the PGW 110 sends the head packet, and the PGW 110 removes the head packet from the queue corresponding to the third UE 150C. Because the queue is now empty, the PGW 110 sets the deficit value for the queue to 0, and ends the performance of the determination operation on the queue corresponding to the third UE 140C.

Referring to the queue for the fourth UE 150D, the PGW 110 increments the deficit value, now 300, by an amount equal to the quantum, 1000. Next, the PGW 110 compares the deficit value to the size of the head packet in the queue. In this case the deficit value, now 1300, is greater than the size of the head packet, now 1200. Accordingly, the PGW 110 subtracts the size of the head packet from the deficit value, the PGW 110 sends the head packet, and the PGW 110 removes the head packet from the queue corresponding to the fourth UE 150D. The PGW 110 then determines the queue for the fourth UE 150D is not empty and compares the deficit value, now 100, to the size of the new head packet, now 1200. In this case, the deficit value is not greater than the size of the head packet. Accordingly, no more packets are sent this cycle for the fourth UE 150D.

Thus, according to the method of queuing data packets according to example embodiments, a scheme requiring processing effort of only $O(n)=O(1)$, where n is number of users, can be used to increase the fairness with which network resources are allocated in the wireless network 100, where fairness is defined as a degree to which each user has equal access to available network resources. Further, the method of queuing data packets according to example embodiments may be applied at multiple network elements in a wireless network, for example one or more PGWs and/or one or more eNBS.

Example embodiments being thus described, it will be obvious that the same may be varied in many ways. Such variations are not to be regarded as a departure from example embodiments, and all such modifications are intended to be included within the scope of example embodiments.

What is claimed is:

1. A method for queuing data packets for a plurality of mobiles in a communications network at a network element, the method including: establishing a plurality of queues corresponding to each of the plurality of mobiles, respectively; receiving data packets associated with the plurality of mobiles at the network element; assigning each of the received data packets to a corresponding one of the plurality of queues; performing a determination operation on a selected queue to determine whether or not to send one or more packets of the selected queue from the network element, based on a packet size of a head data packet and an adaptive transmission threshold value associated with the selected queue, the selected queue being selected from among the plurality of queues, the selected queue being a queue having at least one data packet, the adaptive transmission threshold value changing based on an amount data sent from the selected queue, the head data packet being an earliest received data packet in the selected queue, wherein the determination operation includes, incrementing the adaptive transmission threshold value by adding a reference value to the adaptive transmission threshold value, the reference value being determined based on at least one of a number of users currently accessing the network element, and an amount free resources available at the network element, comparing a packet size of the head packet in the selected queue to the adaptive transmission threshold value, and performing a processing operation including when the packet size is less than or equal to the adaptive transmission threshold value, sending the head packet, subtracting the size of the head packet from the adaptive transmission threshold value, and performing the comparing step and the processing operation for a packet following the head packet in the selected queue, and when the packet size is greater than the adaptive transmission threshold value, ending the determination operation for the selected queue.

2. The method of claim 1 wherein the network element is a packet data network gateway (PGW), the received data packets are data packets included in a downlink stream between an external network and the plurality of mobiles, and when the packet size is less than or equal to the adaptive transmission threshold value, the sending the head packet includes sending the head packet from the PGW towards a mobile from among the plurality of mobiles to which the head packet is addressed.

3. The method of claim 1 wherein the network element is a packet data network gateway (PGW), the received data packets are data packets included in a uplink stream between the plurality of mobiles and an external network, and when the packet size is less than or equal to the adaptive transmission threshold value, the sending the head packet includes sending the head packet from the PGW towards a destination to which the first packet is addressed.

4. The method of claim 1 wherein the determination operation further includes removing the sent packet from the selected queue, when the packet size is less than or equal to the adaptive transmission threshold value.

5. The method of claim 1 wherein the reference value is the same for each of the plurality of queues.

6. The method of claim 1 further including:
receiving quality of service (QoS) information corresponding to the plurality of mobiles at the network element from a policy management element,
wherein the reference value is determined based on a QoS level assigned to the mobile corresponding to the selected queue.

7. The method of claim 6 wherein the reference value is determined to be higher for queues corresponding to mobiles to which high QoS levels are assigned, and the reference value is determined to be lower for queues corresponding to mobiles to which low QoS levels are assigned.

8. The method of claim 1 wherein the network element is a base station.

9. The method of claim 8 wherein the base station is an evolved Node B (eNB), the received data packets are data packets included in an uplink stream between the plurality of mobiles and an external network, and when the packet size is less than or equal to the adaptive transmission threshold value, the sending step includes sending the head packet from the eNB towards a destination to which the head packet is addressed.

10. The method of claim 8 wherein the determination operation further includes removing the sent packet from the queue, when the packet size is less than or equal to the adaptive transmission threshold value.

11. The method of claim 8 wherein incrementing the adaptive transmission threshold value includes adding a reference value to the adaptive transmission threshold value.

12. The method of claim 11 wherein the reference value is the same for each of the plurality of queues, and the reference value is determined based on at least one of a number of users currently accessing the base station, and an amount of free resources available at the base station.

* * * * *